May 24, 1966   H. GALLINA   3,252,372
AUDIO-VISUAL REPRODUCTION DEVICE
Filed April 27, 1964   7 Sheets-Sheet 1
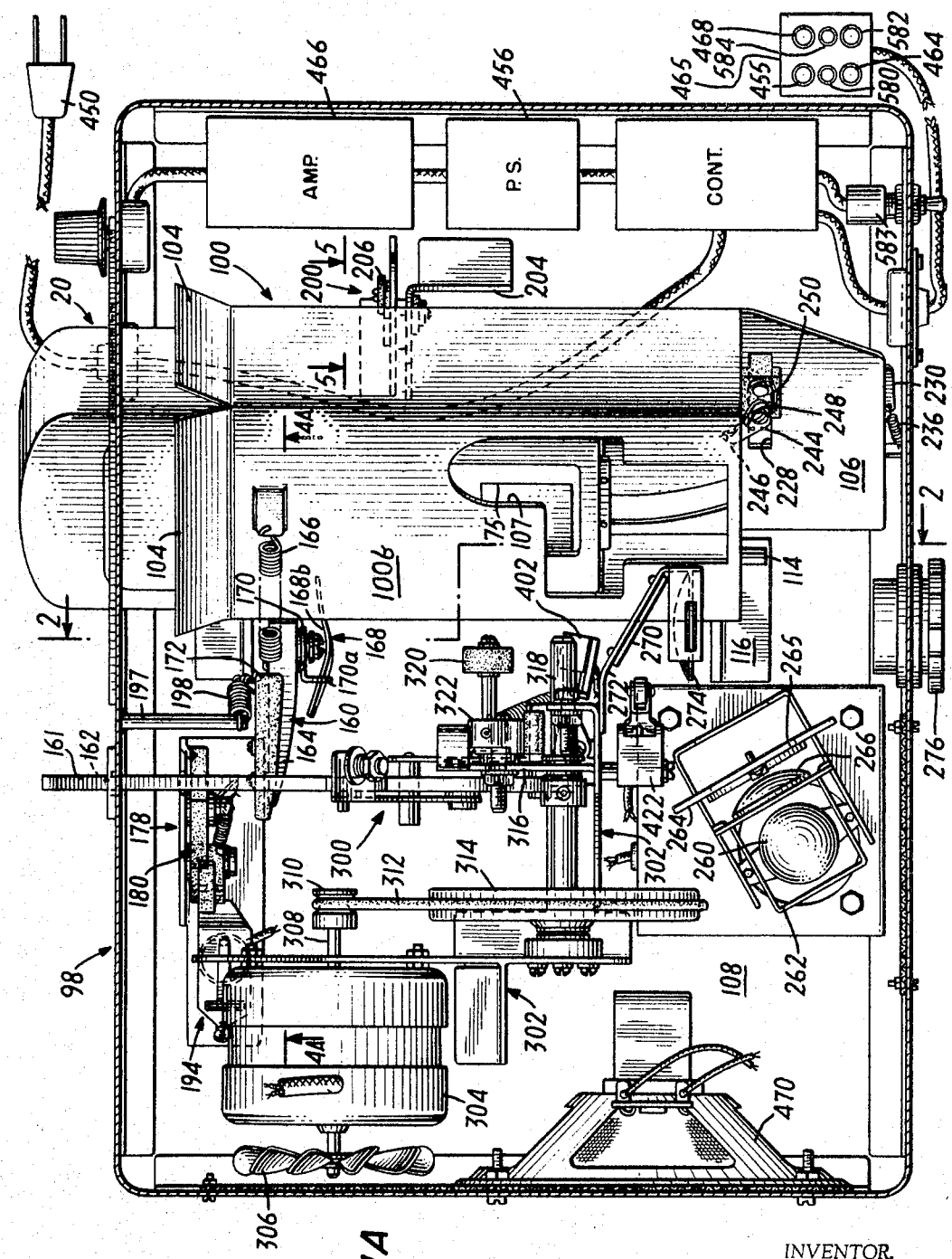
FIG. IA
INVENTOR.
HAROLD GALLINA
BY Brumbaugh, Free, Graves &
   Donohue
his ATTORNEYS May 24, 1966  H. GALLINA  3,252,372
AUDIO-VISUAL REPRODUCTION DEVICE
Filed April 27, 1964  7 Sheets-Sheet 2
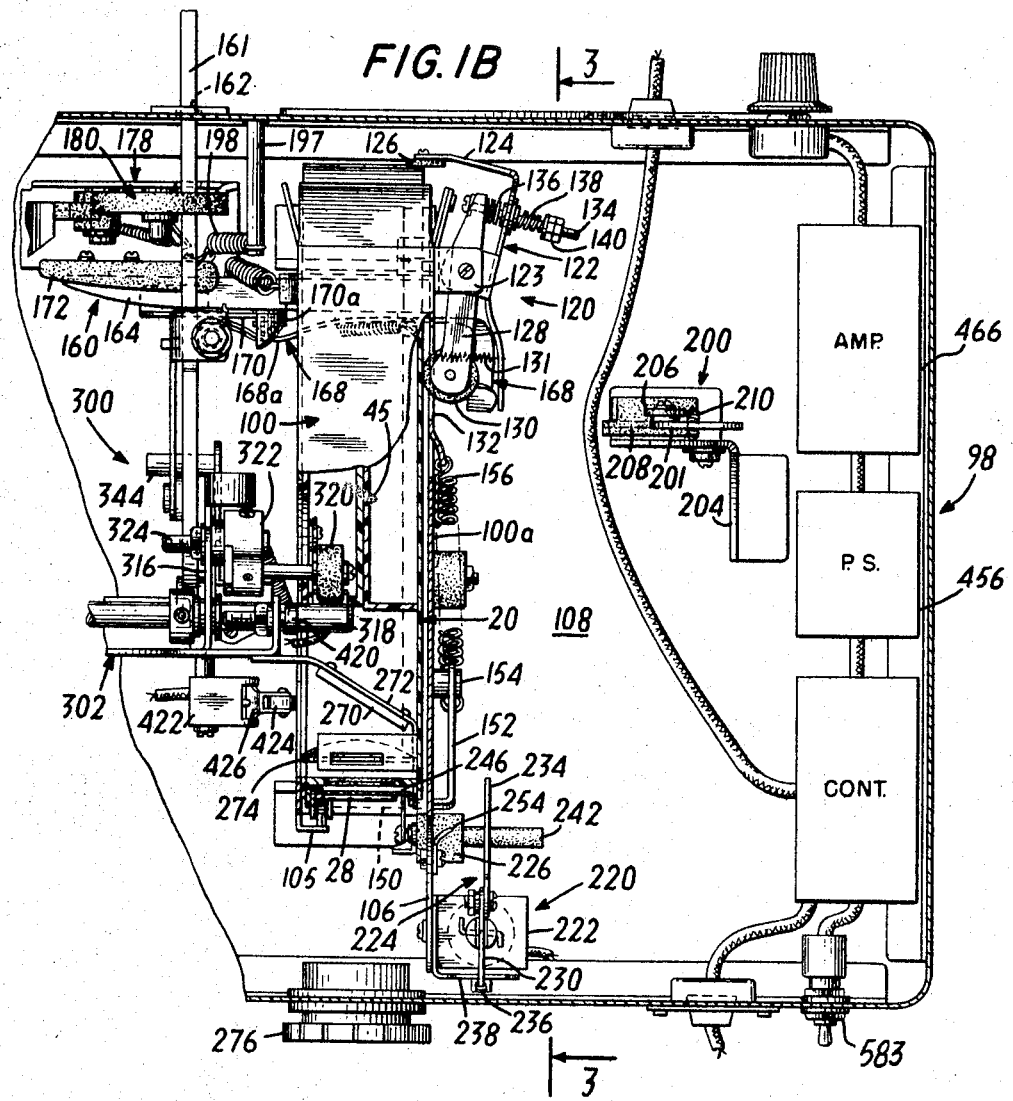
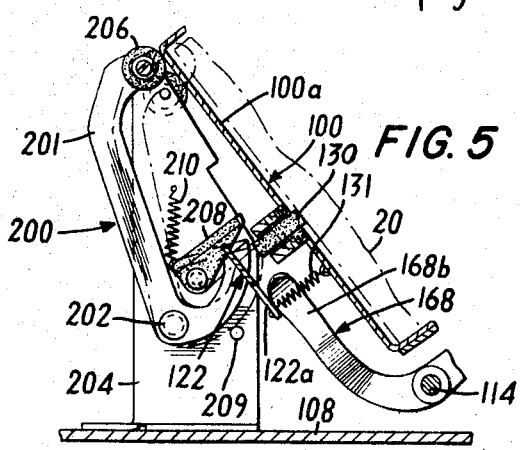
INVENTOR.
HAROLD GALLINA
BY Brumbaugh, Free, Graves &
Donohue
his ATTORNEYS May 24, 1966 H. GALLINA 3,252,372
AUDIO-VISUAL REPRODUCTION DEVICE
Filed April 27, 1964 7 Sheets-Sheet 3

INVENTOR.
HAROLD GALLINA
BY Brumbaugh, Free, Graves &
Donohue
his ATTORNEYS

May 24, 1966 H. GALLINA 3,252,372
AUDIO-VISUAL REPRODUCTION DEVICE
Filed April 27, 1964 7 Sheets-Sheet 4

INVENTOR.
HAROLD GALLINA

BY *Brumbaugh, Free, Graves &*
*Donohue* his ATTORNEYS

INVENTOR.
HAROLD GALLINA
BY Brumbaugh, Free, Graves &
Donohue
his ATTORNEYS

INVENTOR.
HAROLD GALLINA
BY Brumbaugh, Free, Graves &
Donohue
his ATTORNEYS

INVENTOR.
HAROLD GALLINA

United States Patent Office 3,252,372
Patented May 24, 1966

3,252,372
AUDIO-VISUAL REPRODUCTION DEVICE
Harold Gallina, Belleville, N.J., assignor to Elco Corporation, Willow Grove, Pa., a corporation of Delaware
Filed Apr. 27, 1964, Ser. No. 362,799
12 Claims. (Cl. 88—28)

This invention relates to audio-visual reproduction devices, and more particularly, to a novel and improved device for simultaneously reproducing picture images carried on a film strip and sound information carried on a recorded tape.

The advantages of audio-visual media for entertainment, educational and commercial purposes are numerous, and such media are being used in schools, churches, homes and businesses and at an ever-increasing rate. One form in which visual information is carried for repeated reproduction is film strip in which picture images are carried in a series of side-by-side frames on a continuous strip of photographic film. For the reproduction of sound information, magnetic or other types of sound recorded tapes are now probably the most popular form.

While film strips and recorded tapes are often used together, equipment now available for the reproduction of these media is relatively complicated to operate. Moreover, a separate device is usually required for each medium, and there is generally no way of synchronizing the picture and sound information. While devices have been suggested for reproducing both film strips and recorded tapes together, such devices require separate threading of the film, the tape, or both, which is time-consuming and requires considerable skill and knowledge of the equipment.

In many instances, personnel called upon to operate audio-visual reproducing devices of the above-described types do not have the requisite skill to operate them efficiently and properly. For example, most teachers in elementary schools, high schools and colleges are not skilled in the operation of audio-visual equipment and they often refrain from using it, to the detriment of the students who are thus deprived of the great value of the high quality audio-visual aids now available for teaching purposes.

In another area in which there is a rapidly increasing utilization of audio-visual aids, the missionary work carried on by churches in foreign countries, and particularly in medical missions, the use of film strips and tape for presentation of educational material is perhaps the best form of audio-visual media available, inasmuch as the pictures generally require considerable study and explanation in order that their presentation may be useful. Again, skilled operators of audio-visual equipment are usually not available.

The equipment now available for reproducing film strips and sound tapes together is expensive and, moreover, is susceptible to jamming or other difficulties of operation. Further, their complex mechanical and electrical systems require relatively frequent maintenance and repair. More importantly, as previously indicated, skilled operators are usually required, but, particularly in schools and missions, such operators are not available. In addition, those projectors which have no means of synchronizing pictures and sound may not be useful in missions where operators are not sufficiently fluent in the language in which the sound is presented, because the operator is unable to determine when the picture should be advanced in accordance with the sound information being presented. In devices which are provided with means for synchronizing sound and pictures, the operation of such means depends entirely upon the proper threading by the operator of the film and tape; that is, the tape and film must be threaded so that the information is initially properly related before the projector is started.

The above and other disadvantages of known forms of devices for simultaneously projecting film strips and reproducing sound recorded tapes are overcome, in accordance with the invention, by providing a novel and improved device which is substantially automatic in operation, requires no threading of either film or tape, and which is started into operation by merely connecting it to a suitable power supply, inserting a cartridge carrying the strip film and the tape into a receptacle, and pushing a lever to engage a tape drive, sound pick-up head and a synchronizing indicator pick-up with the tape and film. Thereafter, the device operates automatically, the film being advanced in response to signals on the tape. Additionally, the device is stopped at the end of the program by a signal from the tape, although means are provided for stopping by the lecturer at any time.

More particularly, a device, in accordance with the invention, which hereinafter will be referred to for convenience as a projector, though it will be understood that sound producing means is an integral part thereof, comprises a cartridge for carrying the sound tape and the film strip, the cartridge having an end wall with an aperture wherein the images on the film strip are sequentially positioned, a receptacle for the cartridge, tape drive means selectively movable into a drive position in which the sound tape is engaged and driven thereby, film drive means for intermittently moving the film strip past the cartridge aperture, sound reproducing means for reproducing sound information on the tape which includes a sound pick-up head arranged to contact the tape when the cartridge is in operable position in the projector, and means for projecting the images on the film strip which includes a light source and means for directing the light source along a path wherein it is passed through the aperture in the cartridge and thence through a lens which focuses it onto a screen or other suitable surface. Further, means for synchronizing the advance of the film strip in accordance with the sound information on the tape is provided, such means preferably comprising indicators on the tape and means arranged to contact the tape when the cartridge is operably positioned in the projector and responsive to the indicators for producing a signal which initiates the advance of the film strip.

An important feature of a projector, in accordance with the invention, is the fact that both the tape and the film strip are carried entirely within a cartridge and are reproduced by conveying them while they remain in the cartridge, as will be described in greater detail hereinafter, thus eliminating the need for threading of the film or tape by an operator. The cartridges can be supplied with the film strip and tape in place, having been assembled by a skilled operator at a central location and then distributed to the users. Thereafter, no additional attention to threading and synchronizing need be given by operators in schools, missions, churches or the like. Nevertheless, if skilled personnel is available at the place where the projectors are used, the programs in the cartridges can be changed with relatively little difficulty. Moreover, the threading of the film in the cartridge is quite simple, and any person not skilled in audio-visual equipment can readily understand the threading and will be able to load the cartridge after only a little experience.

A further feature of the device is the provision of synchronizing means for advancing the film strip in accordance with the sound information. Inasmuch as the film and tape are pre-threaded and, preferably, are both of continuous form, the operation of the synchronizing means does not depend upon the threading of the projector, as in known devices, and once the film and tape have been loaded into the cartridge and properly positioned relative to the respective information thereon initially, the synchronizing means thereafter maintains the picture and sound information in proper relation through as many repeated showings as desired. After the completion of the program on the strip and the tape, the film and tape have returned to their initial positions, the movement of both the tape and film being terminated in response to a signal on the tape itself. Preferably, means are provided in the cartridge for positively locking the film and tape in fixed positions when the cartridge is removed from the projector, thereby making it impossible for either the film or tape to be unintentionally advanced, and therefore, the synchronization of the information on the film and tape is ensured both when the projector is in use and when the cartridge is removed.

A further advantage of the projector, and perhaps the most important advantage, is that no skill whatsoever is required to operate it, the operation being initiated by inserting the cartridge in a receptacle provided therefor, and pushing a lever which properly engages the film and tape drives, the sound pick-up and the synchronizing indicator sensor and starts the tape drive means and sound reproducing equipment into operation. The projector thereafter operates automatically until the end of the program, when it is stopped, again automatically, and the cartridge ejected from the receptacle.

For a better understanding of the invention, reference may be made to the following description of an exemplary embodiment, taken in conjunction with the figures of the appended drawings, in which:

FIGURE 1A is a top view of the projector, illustrating it with the top portion of the housing removed and its mechanism in a non-operating position;

FIG. 1B is a partial top view similar to FIG. 1A, but partly in section and illustrating the projector mechanisms in their operating positions;

FIG. 5 is an elevational view in detail of a cartridge latch, a latch release and a cartridge ejector mechanism, the view being taken generally along the line 5—5 of FIG. 1A and in the direction of the arrows;

Figure 8:
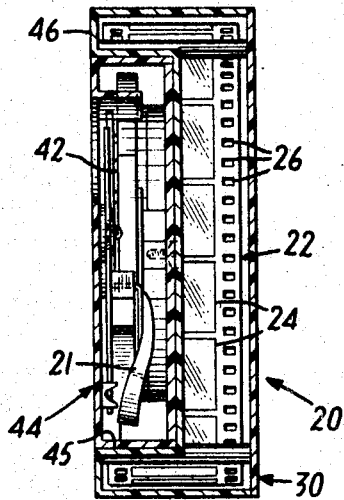
FIG. 8 is a view in section of the cartridge taken generally along the line 8—8 of FIG. 6 and in the direction of the arrows.
Figure 7:
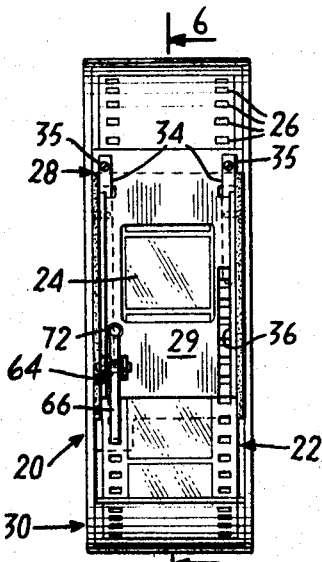
FIG. 7 is an end view of the front end of the cartridge of FIG. 6.
Figure 6:
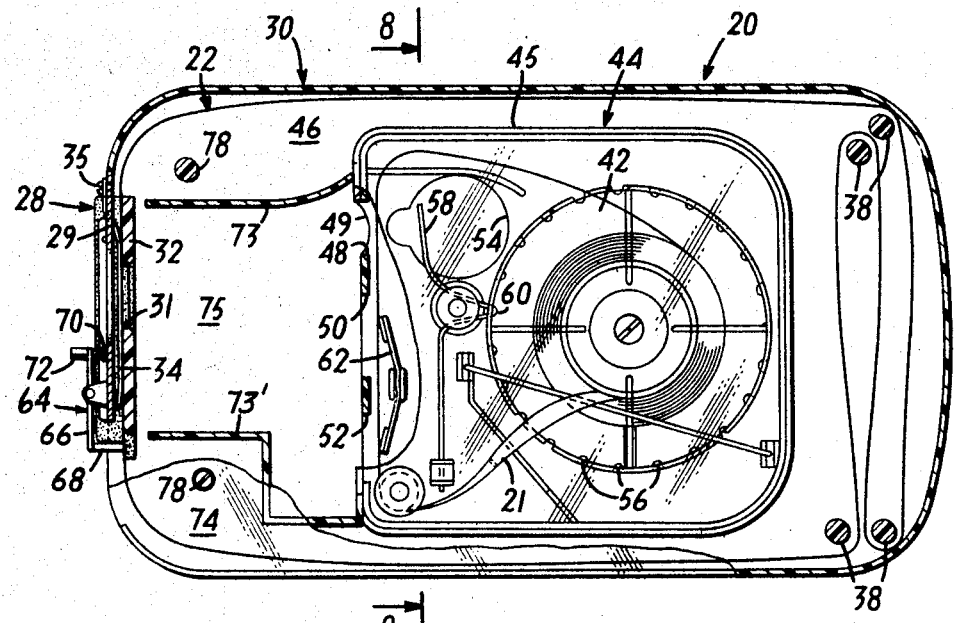
FIG. 6 is a side view of the film and tape cartridge of the projector, a portion of the housing being broken away to enable clearer illustration.

Referring first to FIGS. 6, 7 and 8, the projector includes a cartridge 20 for carrying a sound recorded tape 21 and a film strip 22. The film strip 22 consists of a plurality of frames 24, each having a different picture image, on a strip of photographic film which is provided with spaced-apart sprocket holes 26 at each side. The film strip 22 is passed through a framing structure 28 at the front of the cartridge housing 30 which has an aperture 31 of the same size as the film frames 24. More particularly, the framing structure 28 comprises an outer plate 29 secured on the front end wall of the cartridge housing 30 and an inner plate 32 removably mounted inside the housing 30. The inner plate 32 can be removed and replaced by one having a different sized aperture, thereby enabling film strips having different sized frames to be shown. Thus, the aperture in the outer plate 29 may be large enough to accommodate the largest sized film frames. Between the plates 29 and 32 and extending along each edge of the film strip 22 are springs 34 which urge the film strip 22 against the outer surface of the inner plate 32. The upper ends of the springs 34 pass through to the outside of the housing where they are secured by screws 35.

Along the lower portion of the right edge of the frame assembly 28 (FIG. 7) is a slot 36 which is aligned with the sprocket holes 26 of the film. As will be described in greater detail hereinafter, the film advance mechanism of the projector engages one of the sprocket holes through the slot 36 and moves lengthwise of the slot 36 to advance the film.

The film strip 22 is passed adjacent the upper and lower walls of the cartridge housing 30 and then is looped around a series of transverse posts 38 adjacent the rear end of the housing 30. As shown, the strip 22 is formed as a continuous loop, but it may, of course, be installed in the cartridge 20 in other ways. As previously pointed out, however, the continuous form of the film strip 22 enables repeated recycling of the program without reloading the cartridge or reorienting the film strip.

The sound recorded tape 21 is in the form of a continuous loop, being drawn from the center of a carrier spool 42 and returned to the perimeter of the spool. Inasmuch as a number of the types of sound tape cartridges are known and can be purchased, the cartridge 20 of the projector is arranged to receive a suitable form of commercially available sound tape cartridge 44. For this purpose, a recess 45 is formed in side wall 46 (the far side with respect to FIG. 6) of the cartridge 20 into which the sound cartridge 44 can be positioned and held in place, such as by a snap-in arrangement. The tape cartridge 44 shown in the drawings includes a tape spool 42, which is rotatably mounted in the housing, and has three apertures in the front end, an upper aperture 48 which includes a circular groove 49 formed in the walls of the cartridge and receives a tape drive shaft, and apertures 50 and 52 which, in the usual commercial use of the tape cartridge 44, receive the sound recording and pick-up head and the erase head of a tape recorder. In the projector, according to the invention, the middle aperture 50 receives the sound pick-up head, and the lower aperture 52, the synchronizing indicator sensor, as will be described in greater detail hereinafter. Adjacent the apertures 50 and 52 of the cartridge 44 is a spring 62 for holding, in the normal use of the cartridge 44, the tape against the sound pick-up and erase heads. In the projector, the spring 62 is utilized to hold the tape against the sound pick-up head and indicator sensor.

In the far side of the tape cartridge 44, as shown in FIG. 6 is an aperture 54 which both in the recorders in which it is used and in the projector receives a capstan. The capstan engages against the drive shaft, and thereby provides frictional force enabling the shaft to drive the sound tape 21.

The reel 42 on which the tape 21 is wound includes a series of notches 56 about its perimeter and a wire spring 58 is disposed in the front portion of the cartridge 44. The free end of the spring 58 extends across the opening 54, and when the capstan is inserted through the aperture 54, it moves the spring 58 to the left, with respect to the view thereof in FIG. 6. However, where the capstan is not in the aperture 54, the spring moves to the right and a bent portion 60 thereof engages in one of the notches 56 of the tape reel, thereby precluding the movement of the reel and the corresponding movement of the tape 21 from the position at which they previously had been stopped when the cartridge was removed. Accordingly, the tape is held in a fixed position in the cartridge at any time that the cartridge is not operatively positioned in the projector. Therefore, when the tape 21 and the film strip 22 are properly synchronized in relation to each other upon loading of the cartridge 20, the sound tape 21 cannot accidentally be moved from the synchronized position.

To provide positive locking for the film strip 22 when the cartridge 20 is removed from the projector, in a manner similar to the locking spring 58 of the tape cartridge 44, a detent arrangement 64 is provided on the framing assembly 28. More particularly, the detent comprises a lever 66 pivotally mounted adjacent the left edge of the film and on the outside of the plate 29. At the lower end of the lever 66 is a pin 68 which extends through a sprocket hole of the film strip 22, a spring 70 between the plate 29 and the upper end of the lever urging the pin 68 into place. An outwardly projecting pin 72 at the upper end of the lever 66 is engageable by an element on the projector cartridge receptacle, as described hereinafter, and when moved toward the cartridge, withdraws the pin 68 from the sprocket hole of the film strip. Thus, at any time that the cartridge 20 is in place in the projector, the locking pin 68 is disengaged from the film strip and it can be advanced freely. However, when the cartridge 20 is removed from the projector the pin 68 is urged by the spring 70 into engagement in a sprocket hole of the film, thereby precluding it from being inadvertently advanced. Accordingly, in a manner similar to the recorded tape 21, the film strip 22 is prevented from being inadvertently moved when the cartridge is not in place in the projector, and synchronization of the film and tape are positively retained.

Between the recess 45 in which the tape cartridge 44 is received and the film framing structure 28 of the cartridge 20 is an open portion defined at its upper and lower edges by housing members 73 and 73' which serve to close off the film strip receiving passage which runs generally about the perimeter of the cartridge 20. With respect to the view in FIG. 6, the near surface of the cartridge 20 is completely closed by a wall member 74, the major portion of which is broken away in FIG. 6. The far wall of the cartridge 20 is defined by a cover which, in general extends only adjacent the perimeter; that is, a central aperture 75 is left in the far wall 46 adjacent the sound tape receiving recess 45 and the framing structure 28, being defined also by the housing members 73 and 73'.

In order to enable threading the film strip 22 into the cartridge 20, one or both of the wall members is made removable, such as by fastening them by screws to spacers 78, as shown. Alternately, snap type fastening arrangements could readily be employed. To load the film, one wall member of the cartridge housing is removed, the film strip is inserted into the slot between the framing structure members 29 and 32, passed adjacent the upper and lower edges of the cartridge and looped around as many of the posts 38 as may be necessary to accommodate the particular length of film being loaded. It will be clear, of course, that one or more loops around the posts may be omitted for shorter lengths of film. The posts 38 hold the film strip 22 loosely, so as to prevent it from being bent or otherwise damaged or from becoming jammed, and enable it to be advanced with as little friction as possible.

Figure 3:
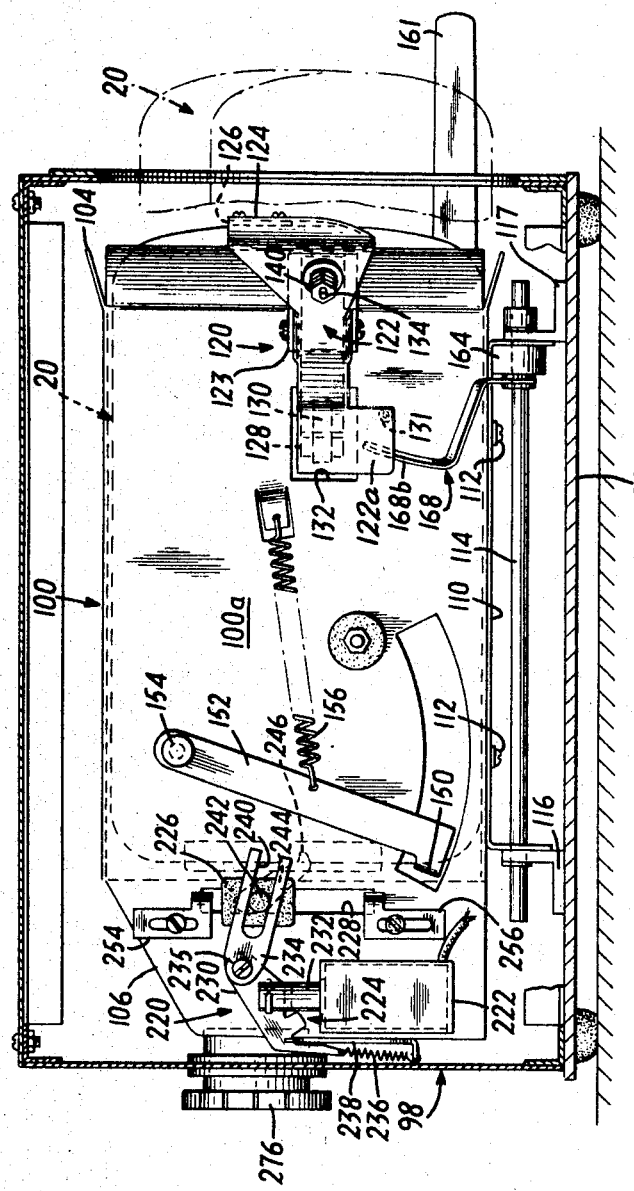
FIG. 3 is a view in section taken generally along the line 3—3 of FIG. 1B and in the direction of the arrows.

Referring now to FIGS. 1A, 1B and 3, the cartridge 20 is received through an opening in the back of the projector housing 98 in a receptacle 100 which is mounted within the housing. The receptacle 100 includes an open back end, which is preferably provided with flared edges 104 to facilitate insertion of the cartridge 20, and is generally rectangular in both cross-section and plan. The front end of the receptacle 100 is also open, and the near side 100a, with respect to the view thereof in FIG. 3, includes an extension 106 projecting toward the front of the housing 98. The other side 100b of the receptacle 100, as best shown in FIG. 1A, has an opening 107 formed therein which is arranged to overlie the aperture 45 of the tape cartridge 44 and the open portion 75 adjacent the front end of the cartridge 20 when the cartridge is in position in the receptacle. Extending from the side 100b at the front of the receptacle is a small lateral arm 105 (FIG. 1B) which removes the pin 68 on lever 66 from the film sprocket hole by pushing the pin 72 inwardly toward the cartridge 20 when the cartridge is inserted into the receptacle.

The receptacle 100 is pivotally mounted on the base 108 of the projector housing 98 by means of a bracket 110 which is secured by screws 112 to the lower end of the receptacle 100 and is received on a rod 114 pivotally disposed in brackets 116 and 117 fastened to the base 108.

Disposed on the near side 100a (as shown in FIG. 3) of the receptacle 100 is a latch mechanism 120 for retaining the cartridge 20 in a predetermined position in the receptacle, upon its insertion. As best shown in FIGS. 1B and 3, the latch mechanism 120 comprises a lever 122 which is pivotally mounted on a bracket 123 secured to the wall 100a of the receptacle 100 and has a laterally extending arm 124 which engages the end of the cartridge 20 when it is installed in the receptacle. A contact foot 126, made of nylon or other relatively frictionless material, is mounted on the end of the arm 124 to reduce friction at the engagement point, so that the arm 124 slides relatively freely along the side and across the end of the cartridge when it is inserted. The inner end of the arm 122 is pulled toward the wall of the receptacle 100 by a spring 131.

The cartridge latch mechanism 120 further comprises a second lever 128 which is also pivotally mounted on the bracket 123. The inner end of the lever 128 has a roller member 130 rotatably mounted thereon which is arranged to project through an opening 132 in the wall of the receptacle 100 when the cartridge 20 is removed. The other end of the lever arm 128 is connected by a bolt 134 to the lever 122 with a spring 136 disposed between the arm 128 and the lever arm 122 and a spring 138 disposed between the arm 122 and a pair of nuts 140 threaded onto the end of the bolt 134.

In operation, the receptacle 100, before the cartridge 20 is inserted into it, is disposed in a tilted, non-operable position, as shown in FIG. 1A. Further, the latch arrangement 120 is in a position such that the roller 130 extends somewhat into the interior of the receptacle 100 and the arm 124 is withdrawn away from the opening at the back end of the receptacle 100. In this position, the cartridge 20 can be inserted, the front end of the framing structure 28 inserted first and the tape cartridge 44 positioned on the right side with respect to the direction of insertion, into the receptacle through the end opening. When the cartridge 20 reaches and contacts the roller 130 it presses the adjacent end of the arm 128 outwardly away from the receptacle wall, thereby urging the opposite end inwardly toward the receptacle wall. This causes the arm 124 to be pulled toward the side of the cartridge 20 by pulling the bolt 134 so that the spring 138 presses the outer end of the lever 122 toward the cartridge. Because the cartridge then blocks the foot 126 and the arm 124 of the lever 122, the lever cannot pivot, the spring 138 being compressed to permit movement of the arm 128 relative to the lever 122, but as soon as the end of the cartridge 20 has been pushed in far enough to clear the foot 126 on the arm 124, the spring 138 urges the foot 126 into engagement with the end of the cartridge 20, as illustrated in FIG. 1B, thereby holding it in the receptacle.

As shown in FIGS. 1B and 3, the front end of the receptacle engages a pusher 150 extending transversely through the receptacle and attached to an arm 152 which is pivotally mounted at its upper end on a pin 154 secured to the side of the housing 100. The arm 152 is pulled rearwardly by a spring 156 and, as will be described in greater detail hereinafter, the pusher 150 operates to eject the cartridge from the receptacle upon the completion of a program. Moreover, the arm 152 acts to properly position the cartridge 20 in the receptacle 100 by holding it firmly against the latch arm 124.

Referring now to FIGS. 2, 4A, 4B and 5, the receptacle 100 is arranged to be pivotally moved from a non-operative position, as shown in FIG. 1A, to an operative position, which is illustrated in FIG. 1B, by a lever arrangement 160, which also actuates other elements of the projector, as will be described in greater detail hereinafter. The lever arrangement 160 includes an operating lever 161 having an outer end which projects outwardly from the projector housing through an opening 162 in the rear wall. An arm 164 is pivotally mounted on the receptacle support rod 114 but is firmly pulled into engagement with the bottom of the receptacle 100 by a spring 166. The outer end of the arm 164 is engaged by the lever 161 upon its downward movement and pivots the receptacle 100 into its operative position.

Figure 4A:
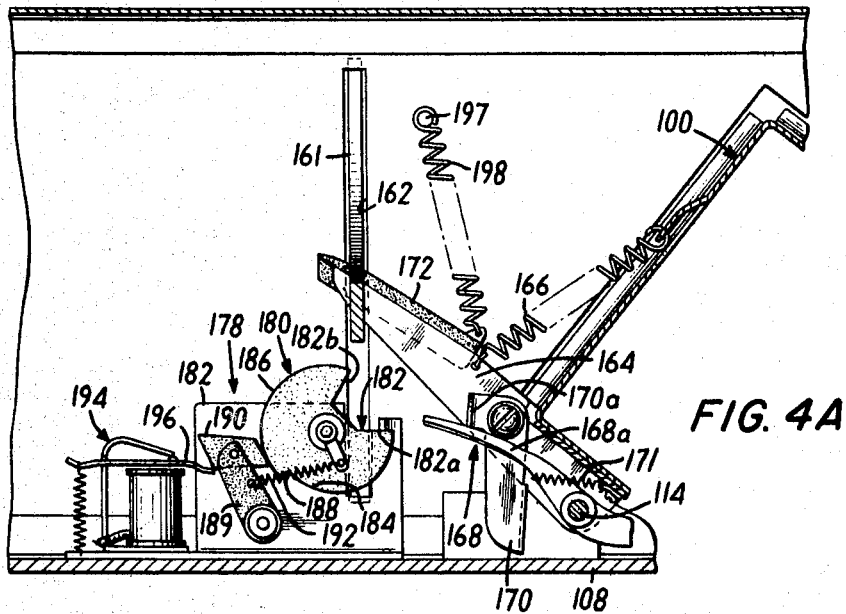
FIGS. 4A and 4B are elevational views of the operating lever and the operating lever latch mechanism of the projector, the views being on an enlarged scale and showing the lever and the lever latch mechanism in two different positions, and both views being taken generally along the line 4A—4A of FIG. 1A and in the direction of the arrows.

As will become more apparent from the description of the operation of the projector set forth hereinafter, it is desirable to prevent the pivoting of the receptacle 100 into its upright operative position, shown in FIG. 1, when the cartridge 20 is not disposed in the receptacle 100. For this purpose, a generally U-shaped lever member 168, pivotally mounted on the support rod 114, and a blocking link 170 pivotally mounted on the arm 164, are provided. The lever member 168 extends transversely of and under the bottom of the cartridge receptacle 100. Referring for the moment to FIGS. 1A and 4A, the blocking link 170 includes a lateral extension 170a, which is engaged by one end 168a of member 168. The other end 168b of the member 168, as best shown in FIGS. 3 and 5, is engaged by a downwardly extending part 122a of the cartridge latch lever 122.

When the lever 122 is in the outward position, that is, when its lateral arm 124 is withdrawn from the cartridge receiving aperture in the receptacle 100, the end 168b of member 168, as shown in FIG. 5, is pushed inwardly toward the wall 100a of the receptacle 100. In this position, the other end 168a of the arm 168 is in a lower position, as shown in FIG. 4A, and the blocking member 170 is permitted to hang freely by gravity in a generally vertical position. When the lever 161 is pushed down by an operator, the arm 164 is engaged thereby and, because of the spring 166, tends to pivot the receptacle 100 counterclockwise about the rod 114, but pivoting of the receptacle 100 is prevented, inasmuch as the blocking link 170 engages the base 108 of the projector, thereby preventing movement of the arm 164.

When the cartridge latch lever arm 124 is in its latching position, as shown in FIG. 1B, and the cartridge 20 is in place, the end 168b (FIG. 5) is permitted to pivot away from the receptacle, and the end 168a of the arm 168 (FIG. 4A) is accordingly moved upwardly by a spring 171, engages the projecting tab 170a on the blocking link 170, and pivots the link 170 clockwise, with respect to FIG. 4A. Accordingly, when the lever 161 is pushed down, the arm 164 is permitted to pivot counterclockwise about the rod 114, inasmuch as the blocking link 170 is disposed angularly to the base and upon further movement of the lever slides into the position shown in FIG. 4B.

The downward movement of the arm 164 draws, by means of the spring 166, the receptacle 100 into its vertical operable position. To facilitate the sliding of the arm 164 under the lever 161 as it is pressed downwardly, it is preferable to provide a nylon or other relatively friction-free element 172 on the sliding surface of the member 164.

Figure 4B:
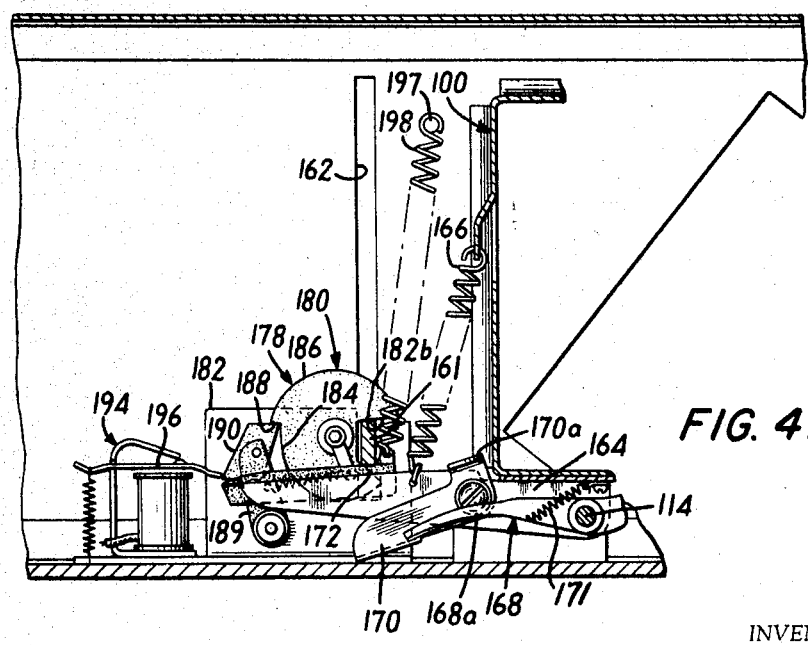

The structure illustrated at the lower left of FIGS. 4A and 4B is a lever latching structure 178 for holding the lever 161 in its downward position, whereby the receptacle 100 is held in its upright, operable position.

More particularly, the lever latch structure 178 comprises a cam 180 pivotally mounted on an upright bracket 182 fastened to the projector base 108. In the upper right quadrant of the cam 180, as it is shown in FIG. 4A, is a notch 182. Upon movement of the lever 161 into its down position, as shown in FIG. 4B, the lever moves into the notch 182, contacts the lower edge 182a of the notch and then rotates the cam 180 clockwise into the position shown in FIG. 4B. In the lower portion of the cam as it is shown in FIG. 4A, is a spiral surface 184 which is relieved from a generally cylindrical surface 186 at the leftmost portion thereof, thereby providing a shoulder 188.

Pivotally mounted on the bracket 182 to the left of the cam 180 is an arm 189 having a pivotable link 190 at its end. The arm 189 is urged in a clockwise direction by a spring 192 fixedly secured to the pin on which cam 180 is mounted. As the lever 162 is moved downwardly, thereby rotating the cam 180 in a clockwise direction, the link 190 drops past the shoulder 188 on the cam 180 and upon further rotation of the cam 180, the spring 192 draws the arm 189 and link 190 towards the cam pivot and into the position shown in FIG. 4B.

Fixedly mounted on the projector base 108 adjacent the bracket 182 is an electromagnetically operated detent 194. When the lever 161 is in its lowermost position, the outer end of the link 190 is engaged by the outer end of the detent arm 196, as shown in FIG. 4B, and the cam is restrained thereby from counterclockwise rotation. Attached between the arm 164 and a rod 197 secured to the back wall of the projector housing is a spring 198 which urges the arm 164, and therefore the operating lever 161, upwardly. However, the upper edge 182b of the cam 182 engages the operating lever 161, and inasmuch as the cam 180 is prevented from being rotated counterclockwise by the engagement of the outer end of the link 190 by the detent arm 196, the operating lever 161 is securely latched in the position illustrated in FIG. 4B.

Upon energizing of the electromagnetic detent 194, however, the detent arm 196 is pulled downwardly and the link 190 is released, thereby permitting the cam 180 to rotate counterclockwise. Therefore, the spring 198 pulling against the arm 164 returns the lever 161 to its upper position. Moreover, the receptacle 100 is pivoted back into its non-operable position, as shown in FIG. 4A.

The pivoting of the receptacle 100 back into non-operable position (FIG. 1A) actuates a cartridge ejector mechanism 200, which is best shown in FIG. 5. The ejector mechanism includes a generally C-shaped arm 201 which is pivotally mounted on a pin 202 extending from a bracket 204 secured to the base 108 of the projector housing. The upper end of the arm 201, which has a nylon roller 206 thereon, is engaged by the upper portion of the wall 100a of the receptacle 100 and pushed outwardly thereby, when it is returned to its non-operable position. Also pivotally mounted on the bracket 204 is a link 208 which is urged in a clockwise direction by a spring 210. The end 122a of the cartridge latch lever 122 is arranged to be engaged by the link 208 upon return of the receptacle 100 to its non-operable position, the position of the link 208 before the receptacle 100 has returned to its non-operable position being illustrated by dashed lines in FIG. 5. More particularly, the spring 210 rotates the link 208 clockwise through several degrees to a limit position provided by engagement of the lower end of arm 201 against a stop 209.

In operation, when the receptacle 100 is urged by the return spring 198 into its non-operable position, the end 122a of the cartridge latch arm 122 is engaged and pressed by the link 208 into its release position; that is, referring to FIG. 1B, the arm 122 is pivoted clockwise and its end 126 removed from engagement with the back end of the cartridge 20. The ejector member 150 then (shown in FIG. 3) pushes the cartridge 20 partially out of the receptacle 100 and into, generally, the position shown in FIG. 1A.

Upon further pivoting of the receptacle 100, its wall 100a contacts the roller 206 on arm 201 and moves the arm 201 counterclockwise. Accordingly, the lower end of the arm 201 then presses upwardly against the lower edge of the link 208, thus rotating the link 208 counterclockwise. Counterclockwise movement of the link 208 moves it out of engagement with the arm 122, thereby releasing the latch arm 122 so that it can be operated when another cartridge 20 is inserted into the receptacle 100. If the link 208 were not moved out of engagement with the arm 122, it will be readily apparent that the cartridge latch mechanism 120 would be prevented from operating upon insertion of another cartridge, and thus the arm 201 provides for rendering the ejector mechanism 200 inoperative after it has completed its function of ejecting the cartridge 20.

The above-described elements of the projector provide, generally, for positioning of the cartridge in the receptacle and movement of the receptacle and the cartridge therein between its operable and non-operable positions. There now follows a description of projector elements for advancing the film strip, driving the tape and for reproducing the information carried on the film and tape in synchronized relation.

Referring to FIGS. 1A, 1B and 3, the film strip 22 is advanced by a film advance mechanism 220 which is mounted on the extension 106 of the near side receptacle wall, as shown in FIG. 3. The film advance mechanism 220 is operated by a solenoid 222 which is coupled by a linkage 224 to a slider 226 disposed in a vertically extending slot 228 in the extension 106. The linkage 224 consists of a first element 230, pivotally connected to the rod member 232 of the solenoid 222, and a second element 234, attached at the inner end of the member 230 by a bolt and nut 235, thereby enabling the adjustment of the arm relative to the film. The outer end of the element 230 is connected by a spring 236 to a bracket 238 on the extension 106, and its lower edge bears against the top edge of the bracket 238, which thus provides a fulcrum about which the linkage 224 is pivoted. The end of the second link element 234 has a longitudinally extending slot 240 which slidably receives a pin 242 on the slider 226.

Pivotally mounted on the side of the slider 226 adjacent the receptacle front opening, as best shown in FIG. 1A, is an arm 244 having a hook-like end 246. The end 246 is arranged to enter a sprocket 26 of the film strip 22 when the cartridge 20 is inserted into the receptacle 100. The arm 244 is urged in a clockwise direction (with respect to FIG. 1A) by a small coil spring 248, but the extent of rotation is limited by a blocking piece 250 secured to the slider 226.

Upon downward movement of the rod member 232 of the solenoid 222 when the solenoid is energized, the arm 224 is pulled downwardly, pivoting about the fulcrum provided by the bracket 238, and pushes the slider 226 and the arm 244 disposed thereon down to advance the film strip. The extent of movement of the slider 226 is limited by adjustable stops 254 and 256, and, accordingly, the downward movement of the slider 226 and the resulting film advance is predetermined by the adjusted position of the lower stop.

Upon deenergization of the solenoid 222, the spring 236 connected to the linkage 224 pivots the arm upwardly and returns the slider 226 to its upper position, the top limit position being determined by the adjustment of the upper stop 254. Inasmuch as the film-engaging arm 244 is rotatable counterclockwise, against the urging of the spring, its end 246 is moved out of the sprocket hole in the film and the arm slides upwardly along the film 22.

It will be noted that the film advance mechanism 220 can be adjusted to enable the use of different sized film strips or film strips having different sized images, in the projector and therefore the mechanism 220 provides significant advantages over many film advance arrangements in presently known film strip projectors. Moreover, its operation is positive and direct, as compared to many clutch actuated sprocket drives used in conventional projectors.

Figure 2:
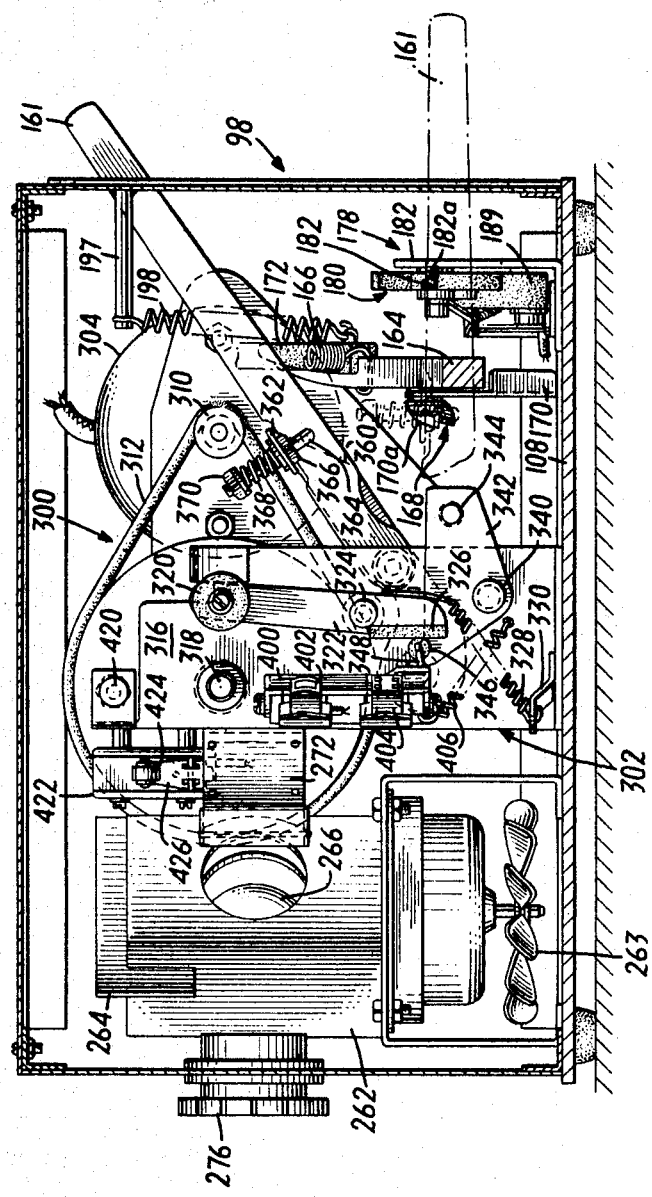
FIG. 2 is a view in section taken transversely through the projector generally along the line 2—2 of FIG. 1A and in the direction of the arrows.

Referring to FIGS. 1A and 1B, the images on the film strip 22 are projected by directing light through the film from within the cartridge 20 and through the aperture 30 wherein the frames 24 are sequentially positioned. The light is provided by a lamp 260 mounted in a housing 262 and cooled by a fan 263 (FIG. 2). Mounted in the lamp housing is a plate 264 having a heat absorbing glass 265 therein for limiting the heating effect of the lamp on the film. Light from the lamp 260 is focused by a condensing lens 266 onto a mirror 270 fixedly mounted on a bracket 272 and is reflected from the mirror 270, which is disposed at a suitable angle, through a lens 274 which directs it through that image on the film 22 which is then positioned in the framing structure 28.

As shown in FIG. 1B, the mirror 270 and lens 274 are received through the cartridge aperture 107 into the open portion 75 of the cartridge 20 which is defined, referring briefly to FIG. 6, between the walls 73 and 73', the framing structure 28 and the front end of the tape cartridge 44. The picture image is then projected through an objective lens 276, which is adjustable to focus the image onto a screen or the like (not shown). Inasmuch as the film images are projected while the film strip is contained in the cartridge 20, no threading is required once the film strip 22 has been loaded into the cartridge 20, unlike presently known projectors which require threading of the film. Thus, a projector, according to the invention, is considerably easier to operate than known projectors of the same general type.

The sound tape drive and pick-up apparatus designated generally by the reference numeral 300 and best shown in FIGS. 1A and 2, is mounted on a bracket 302 secured to the projector base 108. In the tape drive apparatus an electric motor 304, having a cooling fan 306 mounted on one end of its rotor shaft 308, is coupled by a pulley 310 and belt 312 to a fly wheel 314, which is journaled in the bracket 302. Connected to the fly wheel 314 and journaled in a bracket extension 316 is a tape drive shaft 318 which, as best shown in FIG. 1B, extends into the open portion 107 of the cartridge receptacle 100 and contacts the outwardly disposed surface of the sound tape 21 at the upper aperture 48 in the tape cartridge 44 (see FIG. 6) when the receptacle is in its operable position (FIG. 1B). The other surface of the tape is selectively engaged by a capstan 320, best shown in FIG. 2, which is rotatably mounted at the upper end of an arm 322. The arm 322 is pivotally mounted at an intermediate position thereon on a pin 324 secured to the bracket extension 316, the left lower end of the arm 322 has a camming surface extension 326, and the arm 322 is urged in a clockwise direction by a spring 328 connected to a clip 330 attached to the projector base 108.

Pivotally mounted below the arm 322 on a pin 340, which projects from the bracket extension 316, is a lever 342 having, as best shown in FIG. 2, a pin 344 extending from the back surface thereof and normal thereto adjacent its right end and a roller 346 rotatably mounted at its upper left end and engageable with the camming surface 326 on the arm 322. The roller 346 is mounted on a lateral extension 348 of the lever 342 which engages at its left end a portion of a pivotally mounted bracket, as will be described in greater detail hereinafter.

Pivotally mounted on the operating lever 161 of the projector is an arm 360 having an extension 362 thereon which overlies the lever 161. A hook 364 extends through the operating lever 161 and then turns upwardly at right angles and passes through the extension 362. A nut 366 is threaded onto the pin 364 and resides below the extension 362, a spring 368 is positioned above the upper surface of the extension 362 and a nut 370 is threaded on the top of the pin 364 over the spring 368.

Upon downward movement of the operating lever 161, the lower edge of the arm 360 engages the pin 344 on the lever 342, but only after the lever has nearly reached its lowermost position. It will be recalled that the cartridge receptacle 100 is initially moved into the position illustrated in FIG. 1B upon a first increment of movement of the lever 161. Upon further movement of the operating lever 161, the lever 342 is rotated clockwise about its pivot pin 340, thereby moving the roller 346 in a clockwise arc and along the camming surface 326 on the capstan 322. This urges the capstan arm 322 in a counterclockwise direction so that the capstan 320 at its upper end is engaged against the recorded tape 21, as is best shown in FIG. 1B.

It was previously mentioned that the edge of the extension 348 on the lever 342 engages a pivotally mounted bracket. Attached to that bracket, which is designated by the reference numeral 400, are a pick-up head 402 for taking the recorded information from the tape 21 and an indicator sensor head 404 which is responsive to indicating elements or markings on the tape, which will be described in greater detail hereinafter, and synchronizes the advance of the film strip to the recorded information on the tape. When the operating lever 161 is in engagement with the pin 344 on the lever 342, the spring 328 coupled to the arm 322 retains the lever 342 in the position in which it is illustrated in FIG. 2. In that position, the extension 348 on the lever 342 holds the bracket 400, which is pivotal about a vertical axis, in a partially outwardly rotated position so that the cartridge 20 which is received in the receptacle 100 can be moved freely into its operable position, which is shown in FIG. 1B. Actuation of the operating lever 161 which results in clockwise rotation of the lever 342, as described above, moves the extension 316 and thus permits a spring 406 connected between the outer end of the bracket 400 and the bracket extension 316 to pivot the bracket 400 inwardly, and therefore the sound pick-up head 402 and indicator sensor head 404 are brought into operable contact with the tape 21, the head 402 and sensor 404 being received in the apertures 50 and 52, respectively, in the tape cartridge 44 (FIG. 6).

Secured to the upper portion of the bracket 302 near the top of the projector housing are, first, a stop member 420 which engages the top end of the receptacle 100, thereby holding it in a predetermined position and, second, a micro-switch 422 having a roller 424 on its operating arm 426 which is contacted when the cartridge is moved into operable position and thereby closes the switch to initiate the operation of the projector.

Figure 9:
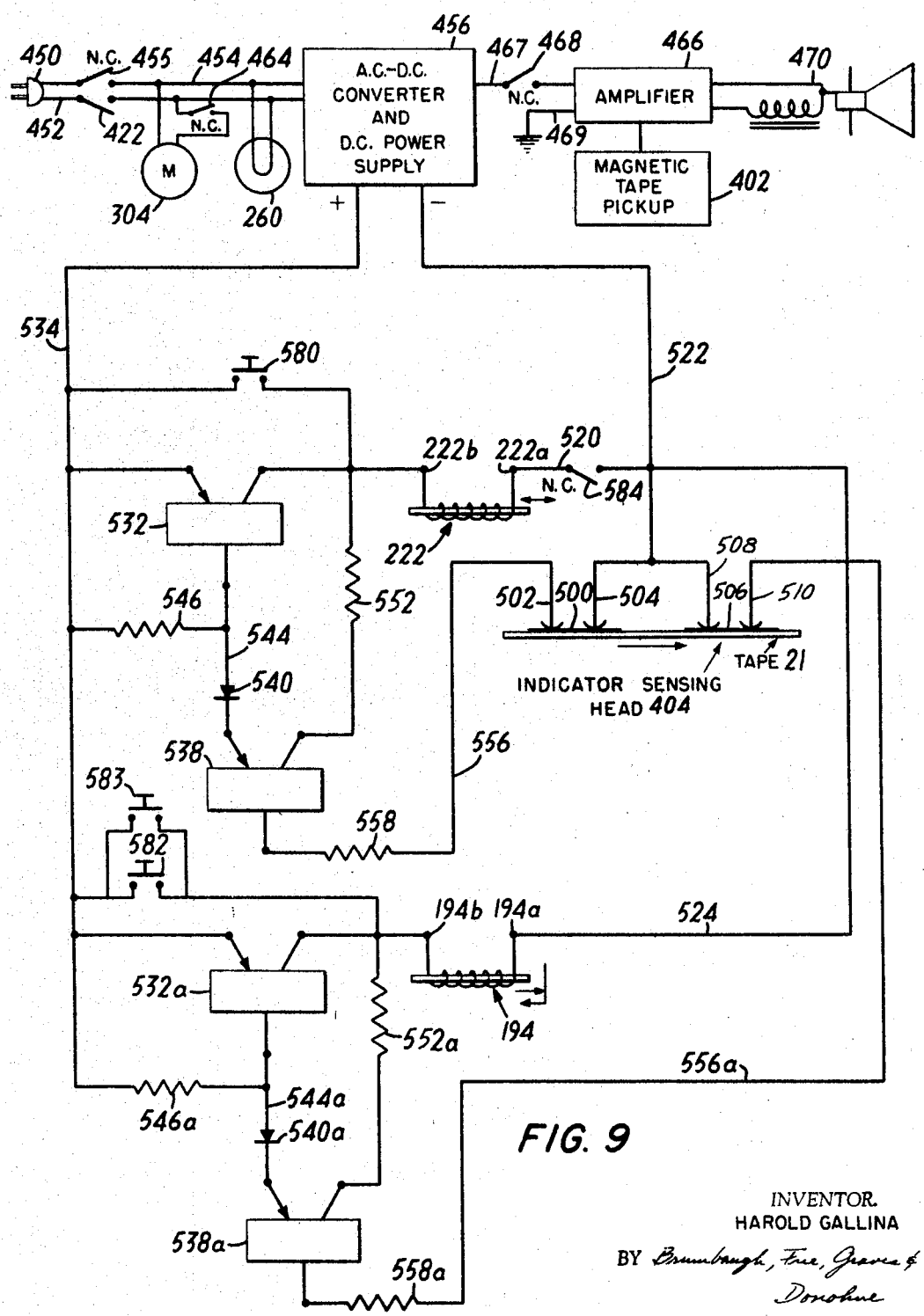
FIG. 9 is a schematic circuit diagram showing the power supply, the sound tape reproducing equipment and the control circuits for the projector.

Referring now to FIG. 9, which shows the electrical and electronic circuitry for the projector, a plug 450, which is of the type adapted for ordinary wall outlets, is connected by a conductor 452 and through the micro-switch 422 by a conductor 454 to an A.C.-D.C. converter and D.C. power supply 456. In the conductor 454 is a normally closed switch 455 located in a remote control box 465 (FIG. 1A). The tape drive motor 304 and the projector lamp 260 are connected across the leads 452 and 454, the motor 304 being provided with a normally closed switch 464 which is also mounted in the remote control box 465. Opening of the switch 464 stops the tape drive, thereby terminating the reproduction of the sound information and permitting a lecturer or other user of the projector to present comments on the pictures being projected or viewing of the pictures without any accompanying sound information. Stopping the motor 304 also terminates the operation of the film tape synchronizing arrangement which automatically advances the film strip, inasmuch as the tape carries indicators which initiate the advance of the film. Thus the tape must be started again before the film strip will advance, or the film strip advanced at the remote control by the user, as will be described in more detail hereinafter.

An amplifier 466 is connected by a lead 467 to the converter and power supply 456 through a normally closed switch 468, which is also contained in the remote control 465, and by a lead 469 to ground. Opening the switch 468 terminates the reproduction of the sound information on the tape, but without stopping the driving of the tape, and therefore a lecturer can provide comments on the pictures without interrupting the automatic advance of the film strip. The sound pick-up head 402 is connected to the amplifier 466 which amplifies the signals therefrom and supplies them to a speaker 470 which, as shown in FIG. 1A, is mounted in the projector housing.

The amplifier 466 may be of any type, many of which are commercially available, and may be operated on A.C. power, such as ordinary 120 volt 60 cycle power, rather than, as shown, by D.C. power. A low voltage D.C. transistorized amplifier is particularly well suited for a projector designed to operate on battery power, which would be a preferred power source in projectors used in mission work and the like.

As mentioned previously, the film strip is advanced in response to signals received from indicators on the sound tape 21. While there are a number of means for marking tapes to provide electrical control signals or the like for operating other devices, a preferred form for the projector of indicating means and means responsive to the indicating means for reproducing an electrical control signal is disclosed in my copending application for "Cueing Method and Apparatus for Record Tape," Serial No. 4,664, filed January 6, 1960. Briefly, there is disclosed in that application a method of marking a tape utilizing a stylus of a high carbon pencil of good electrical conductivity; when the pencil marking applied to the tape bridges a pair of electrodes, an electrical current is permitted to flow from one electrode to the other, and the electrical signal so conducted may be utilized to initiate the operation of other devices.

In the use of the projector, according to the invention, pencil marks, designated in FIG. 9 by the reference numeral 500, are applied on the recorded tape 21 in spaced-apart locations lengthwise of the tape so that they will pass across a pair of spaced electrodes 502 and 504 on the indicator sensing head 404. Moreover, the marks 500 are located on the tape with respect to the information recorded thereon at places where the content changes from references to one picture image to the next picture image on the film strip. Therefore, whenever, the subject matter of the sound information changes, an electrical signal is conveyed through one of the pencil markings 500 from one electrode 502 to the other electrode 504.

Using a pencil marking 506 on the tape 21 transversely spaced on the tape from the markings 500, a second electrical signal is obtained across electrodes 508 and 510 of the sensing head 404 to stop the operation of the projector.

While electrical signals conducted through the indicator pencil marks 500 and 506 might be used directly to energize, respectively, the solenoid 222 which advances the film strip and the electromagnetic detent 194 which releases the operating lever latch to eject the cartridge and thereby terminate the operation of the projector, it has been found that the current conducted through the indicator marks may occasionally be insufficient to energize these elements. Accordingly, it is preferred, in order to provide for maximum certainty that these elements will operate upon cue from the indicator marks to use transistor circuits, which operate in a manner similar to relay switches, a circuit being provided for each pair of electrodes. In the following description of the circuits, which are both shown in FIG. 9 and are substantially identical, the corresponding elements of each are identified by the same reference numerals, but the letter "$a$" is added to the numerals identifying the elements of the circuit which is coupled to the electrodes 508 and 510 and energizes the electromagnetic detent 194. Further, the two circuits will be described together, rather than separately.

The electrical power for the film advance solenoid 222 and the electromagnetic detent 194 is supplied from the converter and power supply 456, a terminal 222a of the solenoid 222 being connected, by leads 520 and 522, to the negative terminal of the power supply, and a terminal 194a of the detent 194 also being connected, by leads 524 and 522, to the negative terminal of the power supply.

In the circuits, the emitter of a power transistor 532, 532a is coupled by a lead 534 to the positive terminal of the power supply 456, and the emitter of a second transistor 538, 538a is coupled through a silicon diode 540, 540a to the base electrode of the power transistor 532, 532a by lead 544, 544a. The base electrode of the power transistor is also connected through a resistor 546, 546a by lead 534 to the positive terminal of the D.C. power supply 456.

The other terminal 222b of the solenoid 222, and in the case of the projector stop circuit, terminal 194b of the electromagnetic detent 194, is connected directly to the collector of the power transistor 532, 532a and to the collector of the transistor 538, 538a through a resistor 552, 552a. The electrodes 502 and 510 of the indicator sensing head 404 are, respectively, connected by leads 556 and 556a through resistors 558 and 558a to the base emitters of the transistors 538 and 538a.

As will be apparent to those skilled in the art, the above-described circuit operates essentially as a relay switch and provides power amplification so that the solenoid 222 and the electro-magnetic detent 194 will be energized even when only very small currents are passed through the conductive pencil markings 500 and 506 on the tape 21.

In order that the film advance and the projector stop and cartridge ejector mechanisms can be operated manually, that is, in order that the control circuits can be overriden to provide selective advance of the film or selective termination of the operation of the projector, bypassing switches are provided which are located on the remote control 465 (FIG. 1). More particularly, terminal 222b of the film advance solenoid 222 is connected to the positive terminal of the power supply 456 through a normally-open push-button switch 580. Similarly, terminal 194b of the electromagnetic detent 194 is connected to the positive terminal of the power supply 456 across a normally-open push-button switch 582. Closing of the switch 580 energizes the film advance solenoid 222 to advance the film. Closing of the switch 582 energizes the detent 194, thereby releasing the operating lever latch which allows the receptacle 100 to move into its non-operable position, and the cartridge 20 therein to be ejected. A second switch 583 connected in parallel with switch 582 and performing an identical function is mounted, for convenience, on the projector housing 98 (see FIG. 1A).

The operation of the above-described embodiment of the projector is as follows. The user first inserts the cartridge 20, which has been preloaded with the tape and film strip program, into the receptacle 100, making sure to push it firmly in so that the lever arm 124 of the cartridge latch mechanism engages the back end of the cartridge 20. If the cartridge is not inserted far enough and the retainer is not engaged, the ejector arm 152 (FIG. 3) will push the cartridge back out. The insertion of the cartridge 20 automatically engages the film advance link 244 in a sprocket of the film and releases the film retainer lever 66. After the cartridge is in place in the receptacle, the operating lever 161 is pressed downwardly until it latches, thereby (1) pivoting during an initial increment of movement, the receptacle 100 into its upright, operable position, as shown in FIG. 1B and (2) bringing, during a final increment of movement, the capstan 320 into engagement with the shaft 318 and the sound pick- up head 402 and indicator sensor 404 into contact with the tape. The movement of the receptacle into its operable position also closes the microswitch 422, thereby starting the motor 304, turning on the projector lamp 260, and energizing the converter and power supply 456, the amplifier 466 and the indicator sensing circuits. Accordingly, the projector is started into operation immediately.

The film and tape in the cartridge are automatically reproduced in their proper synchronization. More particularly, as each indicator marking 500 signaling a change of subject matter of the recorded information on the tape passes the electrodes 502 and 504 of the indicator sensor head 404, electrical power is supplied to the film advance solenoid 222, thereby energizing it and advancing the film in the manner which has been described above. Thus, each picture on the film is shown in sequence and in synchronized relation to the material recorded on the tape.

After the program is completed, that is, when the conductive marking 506 on the tape passes the electrodes 508 and 510, electric power is supplied to the electromagnetic detent 194 which releases the operating lever latch 178. The initial movement of the operating lever 161 permits the film drive capstan 320 to withdraw from engagement with the shaft 318 and, further, moves the tape head 402 and indicator sensing head 404 out of contact with the tape. Further movement of the lever 161 moves the receptacle 100 towards its non-operable position, thereby opening the micro-switch 422 and terminating the supply of electrical power to the projector. As previously described, the ejector mechanism 200 automatically partially ejects the cartridge 20 so that it is readily removable by the user, and, moreover, resets the cartridge latch mechanism on the receptacle so that another cartridge can be received in the receptacle. Accordingly, the projector is now in condition for the next tape and film program in another cartridge or, of course, for repetition of the same program.

In addition to automatic operation of the projector, as described above, certain operation may be initiated by the user through the remote control box 465. First, if it is desired to stop the operation of the projector temporarily, while still displaying a picture, the switch 464 may be opened by pressing the switch button on the remote control box 465, thereby stopping the film drive motor and terminating the supplying of a signal from the sound pick-up head 402 to the amplifier 466. Secondly, if it is desired to advance a frame of the film and, moreover, to operate the projector only as a film projector only, that is, to operate it without any sound, the film can be advanced by closing the switch 580 on the remote control box. When using the projector only to reproduce film strip pictures, the switch 464 can be opened to stop the motor and the switch 468 can be opened to turn off the amplifier.

It should be noted that if an image is advanced prematurely by closing the switch 580, the film will be advanced again when the film advance indicator signal on the tape is reached. In other words the advancing of the film manually can result in a loss of synchronization between picture information and sound information. To overcome this, referring to FIG. 9, a normally closed switch 584 disposed in the remote control box 465 is connected in lead 520 between terminal 222a of the film advance solenoid 222 and the negative terminal of the power supply 456. When the switch 584 is opened, the passage of current through the solenoid 222 is prevented, even though a signal is produced by the indicator sensor.

If it is desired to stop the projector completely at any time during the showing of the program, one of the push-buttom switches 582 or 583 can be closed, thus energizing the electromagnetic detent 194, releasing the operating lever 161, moving the receptacle to its non-operating position and ejecting the cartridge, in the same manner as when the projector is automatically stopped by the indicator marking 506 on the tape.

The last-mentioned manually operated procedures, of course, are entirely optional, and may be provided only as an additional accessory. Moreover, the remote control box 465 is readily disconnected so that the projector can be operated only automatically. When the remote control is provided, each push-button can be clearly marked so that its function is readily identifiable by an operator who has only a minimum of skill in operating audio-visual equipment.

While in the above-described embodiment of the projector, the cartridge is inserted into a receptacle which is entirely contained within the projector housing and is movable between an operative and a non-operative position, the cartridge could very well be inserted into a fixed receptacle, such as a suitable bracket or an opening at the side of the projector housing. In such arrangements the cartridge can be inserted and a lever system, similar to that described above, or a solenoidally operated system utilized to engage the tape drive, the tape sound pick-up head and the indicator sensor. Further, rather than pivoting a cartridge in a pivotally mounted receptacle, the drive and pick-up mechanisms can be mounted on a pivotable bracket which is moved into and out of operative relationship with a cartridge in a fixed receptacle or bracket. Also, translation of the cartridge or the drive and pick-up mechanisms can be substituted for rotation (pivoting) to provide operative engagement of one with the other.

The above described embodiment is meant to be merely exemplary, and many variations and modifications of it can readily be made by those skilled in the art without departing from the spirit and scope of the invention. Such modifications and variations are intended to be within the scope of the invention as defined in the appended claims.

I claim:

1. A device for reproducing picture images carried on a film strip and sound information carried on a recorded tape, comprising a cartridge for carrying the sound tape and the film strip, a projector housing, a receptacle in said housing for receiving said cartridge, a bracket in said housing, tape drive means mounted on said bracket, said tape drive means including an element movable between a non-drive position and a drive position in engagement with the sound tape, means for selectively advancing the film strip past said cartridge aperture, sound reproducing means in said housing, said sound reproducing means including a pick-up head mounted in a position for operative engagement with the film strip, and cartridge receptacle being movable relative to the bracket between a non-engageable position and an engageable position wherein said tape drive means and sound pick-up head are positioned for operatively engaging the recorded tape, and means for projecting the images on the film strip which includes a light source, a lens for projecting the images on the film strip and means for directing light from said light source through said cartridge aperture wherein the film images are sequentially disposed and thence through said lens.

2. A device for reproducing picture images carried on a film strip and sound information carried on a recording tape comprising a cartridge for carrying the sound tape and the film strip, said cartridge having an aperture wherein the images of the film strip are sequentially positioned, a receptacle for said cartridge having an aperture for receiving the cartridge therein, said receptacle being movable between an inoperable and an operable position, tape drive means movable between the non-drive position and the drive position in which the sound tape is engaged by said drive means, means engageable with the film strip for selectively advancing the film strip past said cartridge aperture, sound reproducing means which includes a sound pick-up head for contacting the sound tape in said cartridge, said sound pick-up head being selectively movable between an inoperable position and an operable position in contact with the tape, means for moving said receptacle into its operable position, means for moving said tape drive means into drive position, means for moving said sound pick-up head into operable contact with the tape, a single operating lever common to all of said moving means, and means for projecting the images on the film strip including a light source, a lens for projecting the images on the film strip and means for directing light from said light source to said cartridge aperture wherein the film images are sequentially disposed and thence through said lens.

3. A device according to claim 2, wherein said common lever moves said receptacle into its operable position before moving said tape drive means and said pick-up head into, respectively, their drive and operable positions.

4. A device for simultaneously projecting picture information carried on a film strip and sound information carried on a recorded tape, the recorded tape having indicator means thereon, comprising a cartridge for carrying the tape and film strip, said cartridge having an aperture wherein the images on said film are sequentially positioned and the film strip being disposed in said cartridge such that it is movable past said aperture, a receptacle for said cartridge having an opening therein for receiving said cartridge and mounted for movement between first and second positions wherein the cartridge is inoperable and operable, respectively, means engageable with the film strip in the cartridge upon the positioning of the cartridge in its operable position for selectively advancing the film strip past said cartridge aperture, the film advance means being responsive to an electrical signal, means including an indicator sensing head positioned to contact the tape when the cartridge is in its operable position for detecting the indicators on the tape and producing an electrical signal indicative thereof and supplying the signal to said film advance means to advance the film strip, drive means for the tape selectively movable between a non-drive and a drive position in engagement with the tape when the cartridge is in its operable position, sound reproducing means including a sound pick-up head positioned to contact the tape when the cartridge is in its operable position, and means for projecting the images on the film strip which includes a lens for projecting the images, a light source, and means for conveying light from said light source through the aperture in said cartridge and the film image therein and thence through said lens.

5. A device for simultaneously projecting picture information carried on a film strip and sound information carried on a recorded tape comprising a cartridge for carrying the tape and the film strip, said cartridge having a framing aperture and the film strip being disposed in said cartridge such that it is movable to sequentially position the images thereon in said framing aperture, receptacle means for receiving said cartridge, said cartridge receptacle means being movable between first and second positions wherein it is inoperable and operable, respectively, means engageable with the film strip when the cartridge is in its operable position for selectively advancing said film strip, drive means for said tape selectively movable between a non-drive and a drive position in engagement with the tape when the cartridge is in its operable position, sound reproducing means which includes a sound pick-up head selectively movable between an inoperable and an operable position in contact with the tape, lever means coupled to said cartridge receptacle and movable a first predetermined distance to a first position to move said receptacle and to position the cartridge in its operable position and coupled to said tape drive means and to said sound pick-up head and movable a second distance to a second position to move said tape drive means into its drive position in engagement with the tape and said pick-up head into its operable position in contact with the tape, and means for projecting the images on the film which includes a lens for projecting the images on the film, a light source, and means for directing light from the light source through the aperture and said cartridge and the film image therein and thence through said lens.

6. A device according to claim 5, further comprising releasable latch means for selectively holding said lever means in said second position.

7. A device according to claim 6, wherein the tape is provided with indicator means, and the device comprises means responsive to said indicator means on the tape for producing an electrical signal, electrically operated means connected to said signal producing means for releasing said lever latch means, whereby said receptacle is released and moves to its non-operable position, said tape drive means moves to its non-drive position and said second pick-up head moves to its non-operable position.

8. A device according to claim 7, wherein said signal producing means includes an indicator sensing head selectively movable between a non-operable position and an operable position in contact with the tape, and said lever means is coupled to said sensing head to move said sensing head into its operative position in contact with the tape.

9. A cartridge for use in a device for simultaneously reproducing picture images carried on a film strip and sound information carried on a recorded tape which includes film advance means, film image reproducing means, tape drive means and a tape sound pick-up head, comprising a housing, a framing aperture formed in the housing wherein the images on the film strip are to be sequentially positioned, an enclosure in the housing having means therein for holding a continuous length of strip film and including guide means therein for guiding the film past the aperture along an endless path defined by said guide means, means defining an opening in said housing for receiving the projector film advance means, an entirely self-contained cartridge carrying a continuous sound recorded tape, and means on said cartridge housing for removably securing the self-contained tape cartridge on the housing in a position for operative accessibility to the tape drive means and tape sound pick-up head of the projector.

10. A device for reproducing picture images carried on a film strip and sound information carried on a recorded tape comprising a housing, a cartridge for carrying the sound tape and film strip, said cartridge having an aperture wherein the images on the film strip are sequentially positioned, a receptacle for said cartridge, the receptacle being movably mounted on the housing between a non-operable position in which the cartridge can be manually positioned therein from outside the housing and an operative position wherein the cartridge is positioned within the housing, tape drive means movable between a non-drive position and a drive position in which the tape is operatively engaged by said drive means when the cartridge is in its operative position in the housing, means for selectively advancing the film strip past said cartridge aperture, sound reproducing means which includes a sound pick-up head engageable with the sound tape when the cartridge is in its operative position in the housing, and means for projecting the images on the film strip which includes a light source, a lens for projecting the images on the film strip and means for directing light from the light source through the cartridge aperture wherein the film images are sequentially disposed and thence through said lens.

11. A device for simultaneously projecting picture information carried on a film strip and sound information carried on a continuous length of recorded tape received in a self-contained tape cartridge, comprising a unitary combined tape and film strip cartridge which includes a body having an aperture wherein the images on the film are sequentially positioned, and an enclosure within the body arranged to receive a continuous film strip, the enclosure having means therein for guiding the film strip along an endless path past the aperture, and means on the cartridge body for removably securing the self-contained sound tape cartridge carrier on said cartridge; a receptacle for said unitary cartridge having an aperture therein, means positioned to enter the enclosure of the unitary cartridge for engaging the film strip and selectively advancing it past said framing aperture, drive means positioned to operatively engage and drive the tape, sound reproducing means which includes a sound pick-up head positioned to operatively contact the tape, and means for projecting the images on the film strip which includes a lens for projecting the images on the film strip, a light source, and means for conveying light from the light source through the cartridge aperture and the film image therein and thence through said lens.

12. A device according to claim 11 including a projector housing carrying said receptacle, film advance means, tape drive means and sound reproducing means and film strip image projecting means, the receptacle being mounted on said housing for movement between a first position in which the cartridge can be manually placed therein from outside the housing and is inoperable and a second position in which the cartridge is within the housing and is operable.

References Cited by the Examiner

UNITED STATES PATENTS

| | | | |
|---|---|---|---|
| 2,639,148 | 5/1953 | Adams | 226—68 X |
| 2,782,680 | 2/1957 | Howell | 88—24 |
| 3,033,077 | 5/1962 | Schwartz et al. | 88—28 |
| 3,146,316 | 8/1964 | Knoth | 242—55.13 X |

FOREIGN PATENTS 1,124,348  2/1962  Germany.

NORTON ANSHER, *Primary Examiner.*

V. A. SMITH, *Assistant Examiner.*